(12) United States Patent
Henkel

(10) Patent No.: US 8,190,727 B2
(45) Date of Patent: May 29, 2012

(54) NETWORK MANAGEMENT SYSTEM FOR AN AIRCRAFT

(75) Inventor: Wolfram Henkel, Rosengarten (DE)

(73) Assignee: Airbus Operations GmbH (DE)

( * ) Notice: Subject to any disclaimer, the term of this patent is extended or adjusted under 35 U.S.C. 154(b) by 107 days.

(21) Appl. No.: 12/503,310

(22) Filed: Jul. 15, 2009

(65) Prior Publication Data

US 2010/0057899 A1    Mar. 4, 2010

Related U.S. Application Data

(60) Provisional application No. 61/134,906, filed on Jul. 15, 2008.

(30) Foreign Application Priority Data

Jul. 15, 2008  (DE) .......................... 10 2008 033 244

(51) Int. Cl.
  *G06F 15/16* (2006.01)
  *G06F 15/173* (2006.01)

(52) U.S. Cl. .......................... 709/223; 709/208; 709/224

(58) Field of Classification Search .......... 709/223–224, 709/208–209
  See application file for complete search history.

(56) References Cited

U.S. PATENT DOCUMENTS

| 5,581,478 | A |  | 12/1996 | Cruse et al. | |
|---|---|---|---|---|---|
| 6,404,743 | B1 |  | 6/2002 | Meandzija | |
| 7,120,678 | B2 | * | 10/2006 | Greuel | 709/220 |
| 7,620,848 | B1 | * | 11/2009 | Tanner | 714/25 |
| 2003/0084174 | A1 |  | 5/2003 | D'Annunzio et al. | |
| 2004/0210664 | A1 |  | 10/2004 | Prendergast | |
| 2006/0154660 | A1 | * | 7/2006 | Waugh et al. | 455/428 |
| 2006/0215580 | A1 | * | 9/2006 | Iinuma | 370/254 |
| 2007/0245012 | A1 | * | 10/2007 | Ewing et al. | 709/223 |
| 2007/0260911 | A1 |  | 11/2007 | Marilly et al. | |
| 2008/0297375 | A1 | * | 12/2008 | Khuzadi | 340/945 |
| 2009/0034540 | A1 | * | 2/2009 | Law | 370/400 |

FOREIGN PATENT DOCUMENTS

DE         19731026 A1    1/1999

* cited by examiner

*Primary Examiner* — Joshua Joo
(74) *Attorney, Agent, or Firm* — Lerner, David, Littenberg, Krumholz & Mentlik, LLP

(57) ABSTRACT

A network management system in an aircraft for managing and maintaining a network. An aircraft maintenance computer communicates with a first device to be managed via the SNMP protocol. The first device to be comprises a description file. Within a subnetwork one or more second devices to be managed are present which are linked with the first device to be managed. These second devices to be managed enter their data into the description file via these connections. The data are necessary for managing and maintaining the respective second device to be managed by the aircraft maintenance computer. Therefore the aircraft maintenance computer is enabled to manage and maintain the first and the second devices only by means of the central MIB.

20 Claims, 11 Drawing Sheets

NETWORK MANAGEMENT SYSTEM FOR AN AIRCRAFT

CROSS-REFERENCE TO RELATED APPLICATIONS

This application claims the benefit of the filing date of U.S. Provisional Patent Application No. 61/134,906 filed Jul. 15, 2008, the disclosure of which is hereby incorporated herein by reference.

BACKGROUND OF THE INVENTION

The invention relates to the management of components of a network in an aircraft. In particular, the invention relates to a network management system for an aircraft; a method for the management and maintenance of a network in an aircraft; an aircraft comprising such a network management system; and the use of a network management system in an aircraft.

Electronic systems in aircraft need to meet particularly high safety requirements. For example, if malfunctions or failures of various components of the network occur in a network, a central system should ensure that ramifications to the remaining components of the network or beyond it to the aircraft are kept to the minimum possible.

In order to meet the safety criteria also in relation to system components of the aircraft, or in order to subject these components to these safety standards, these commercial-off-the-shelf (COTS, commercial products) products or external components need to be equipped with software that needs to be defined by the aircraft manufacturer.

In this context, hitherto-known solutions use non-standardised communication protocols and transmission protocols in order to monitor components in a network of an aircraft, and in order to react to failure messages.

In order to be able to ensure at any point in time during a flight that full functionality of all the components is provided, special test equipment is integrated in the aircraft in order to be able to carry out special tests on the components of the network.

Furthermore up to now it is a typical procedure that each single failure message of any component of an electronical aircraft system is instantly and on a direct physical way reported to a central system. This uncontrolled failure reportage may not be based on a central failure request. This may lead to disadvantageous, extensively large and temporally unbunched dataflow within the aircraft.

BRIEF SUMMARY OF THE INVENTION

It can be considered as an object of the invention to provided for an improved management and maintenance of a network in an aircraft.

A network management system, a method for the management and maintenance of a network in an aircraft, an aircraft comprising such a network management system, and the use of such a network management system in an aircraft are provided according to the features of the independent claims. Advantageous embodiments of the invention are provided in the dependent claims.

The exemplary embodiments described equally relate to the network management system, to the method, to the aircraft, and to the use of a network management system in an aircraft.

It should be pointed out that in the context of the present invention the following definitions and abbreviations are used:

Simple Network Management Protocol (SNMP):

SNMP is a network protocol that was developed by the IETF in order to be able to monitor and control network elements from a central station. In this arrangement the protocol regulates communication between the monitored devices and the monitoring station. To this effect SNMP describes the structure of the data packets that can be sent and further describes the communication process. In this context SNMP is understood to denote that each networkable device can be incorporated into monitoring. The task of network management includes among other things the monitoring of network components, the remote control and remote configuration of network components, as well as failure detection, failure notification, and carrying out tests of the devices to be monitored.

Network Component and Subnetwork Component:

This term describes an individual network component like for example any interface or a controller card. Furthermore, the first device to be managed is the network component, which centrally contains the description file (management information base) for all below situated components. The term below is in this context used to describe the different network layers or the different network levels that are present within the whole network. These components of the network being situated below the first device to be managed are part of a subnetwork and are thus hereinafter described with the term subnetwork components. Accordingly the second device to be managed is situated as a subnetwork component below the first device to be managed. Furthermore a subnetwork component itself may form, build or constitute an entire network which comprises different elements or components.

In other words by means of the terms "first device to be managed" and "second device to be managed" two different types of classes of devices are defined. It may be seen as an important aspect of the invention that at least one device out of each of the two classes is present in the network system. The first device to be managed comprising the description file and the second device to be managed, which is positioned below the first one in the network hierarchy lists, registers or enters entries into the description file of the first device to be managed.

BITE:

Hereinafter, the term BITE (built-in test equipment) refers to hardware and software in a computer system or network, which hardware and software facilitates checking or monitoring the proper functioning of the system or network and network components, and if necessary makes it possible to automatically react to any problems that occur.

Agent:

For the purpose of monitoring, so-called agents can be used. These are programs that run directly on the devices that are being monitored. These programs are in a position to acquire the state of a device. The communication between the first device to be managed and the second device to be managed may be done via SNMP. However, if desired also other transmission protocols like e.g. Low Voltage Differential Signalling (LVDS), Controler Area Network (CAN), RS232 (serial protocol) or RS485 (serial protocol) may be used between these two different types of devices. By means of the aforementioned exemplary protocols failure messages can be transmitted from any second device to be managed to the description file (MIB) of the corresponding first device to be managed. In contrast to this, active system manipulations can be carried out by operational system software, e.g. for switchover, default mode or switch-off. BITE and the SNMP agent carry out the commands of the (SNMP) manager. In this arrangement this operational system software can also form a part of the present invention. By means of SNMP it can be possible for the central management station to be able to communicate with the agents by way of a network. To this effect there are six different data packets that essentially contain commands and data that can be transmitted and received. The commands are as follows: Get, Get next, Get bulk, Set, Response, and Trap. In the context of the present invention the term "central management station" refers to the aircraft maintenance computer.

Description File:

The description file is used as a management information base (MIB) in the sense of the SNMP. The values, which can for example be read out from a first device to be managed by the aircraft maintenance computer and can for example be changed by the aircraft maintenance computer, are described in a description file. These are files in which the individual values are stated in tabular form. The description file may in each case specifically be adapted for a particular component, for a particular device, for a class of devices or for a subnetwork and its components. In this arrangement these description files are organised in the form of a tree topology whose individual branches can be represented either by numbers or, as an alternative, by alphanumeric designations. These files can be written in abstract description languages. For each date that can be called up or changed by the agent, information is stated in these files, for example name, data type, access authorisation, status, description text or the so called object identifier (OID). Furthermore, the term description file can of course also refer to a storage medium or a raw storage medium on which a description file can be filed and stored. In this arrangement it is not mandatory for the description file to be present on the storage medium; instead, said description file can have been stored on the storage device for example by way of an update or an initial installation.

Management and Maintenance:

In this document the terms management and maintenance are used to refer among other things to the following tasks: monitoring of network components and subnetwork components; remote control and remote configuration of network components and subnetwork components; failure detection and failure notification relating to failures in network components and subnetwork components, and carrying out tests of network components and subnetwork components.

Device:

The term device refers to any networkable device that can represent a network component or a subnetwork component. For example, the term device can also refer to a system controller. As long as not explicitly mentioned differently all descriptions and statements given within the context of the present invention relating to the term "device" concern equally and in the same way to the first device to be managed and the second device to be managed.

Manager:

A program that runs on the aircraft maintenance computer in order to regulate and control, by means of SNMP, communication with the first device to be managed.

Aircraft Maintenance Computer:

In this document the term aircraft maintenance computer is used to refer to any central computing unit in an aircraft, which unit is equipped to carry out network management by means of SNMP. The aircraft maintenance computer can, for example, be designed as a server on which various applications run: SNMP managers, client management systems (CMS), application programming interfaces (API), SNMP-CMS and others.

Troubleshooting File:

Troubleshooting manual, file to find and/or rectify failures.

According to an exemplary embodiment of the invention, a network management system for an aircraft for managing and maintaining a network and a subnetwork is provided. In this arrangement the network management system comprises a network and a subnetwork. The network comprises an aircraft maintenance computer, at least one first device to be managed which first device to be managed has a description file. The description file, the first device to be managed and the aircraft maintenance computer are adapted in such a way, that exchange of information or data between the aircraft maintenance computer and the first device to be managed is possible via SNMP. Furthermore the subnetwork comprises at least one second device to be managed, wherein the aircraft maintenance computer is adapted for managing and maintaining the first and the second device to be managed. The second device to be managed is connected with the first device to be managed in such way, that the second device to be managed is able to transmit information that is necessary for the management and the maintenance of the second device to the description file of the first device to be managed, whereby the exchange of information between the aircraft maintenance computer and the first device to be managed via SNMP enables the aircraft maintenance computer by means of only the description file to manage and maintain both devices.

In this arrangement the term "network management system for an aircraft for the management and maintenance of a network" can also refer to the management of system components that are interconnected by a network or a subnetwork taking place. Likewise, the term system network is to be understood to be analogously. This also refers to the subnetworks described herein.

Based on the network management according to the invention, the first device to be managed comprises a description file that is adapted as a management information base (MIB) in e.g. tabular form. In this arrangement this description file comprises a failure code in a structured manner. These active failure codes can then be centrally called up or read out by an SNMP manager from the description file in the first device to be managed. The need of other description files in the subnetwork for management or maintenance can be avoided. The aircraft maintenance computer comprises, for example, this manager and can correlate failure codes or it can establish a link to a troubleshooting manual or to a troubleshooting file.

Applying the standard SNMP according to IEEE for highly-specialised aircraft systems can result in the advantages of reduced production costs, reduced integration costs, simpler test equipment, a large user community, and simplified use of commercially existing products.

Due to the integration of a standardised protocol in the network management system of an aircraft, different components of different manufacturers can be integrated more simply. Furthermore, modifications can be achieved more flexibly and cheaper. Likewise, special test equipment can be avoided because it is possible by means of SNMP protocols to carry out tests by the aircraft maintenance computer or by the manager that is stored on the aircraft maintenance computer. For this purpose it is possible, for example, for built-in test equipment (BITE) to provide support. Any additional programming effort relating to different devices for integration in the network can be avoided. Likewise, the technical risk, which is present when using aircraft-specific protocol solutions for each different device, can be reduced for the aircraft manufacturer.

In this way it is possible to prevent a situation in which each system supplier needs to understand, implement and test the aircraft-producer-specific protocol or the aircraft-operator-specific protocol. In this way it is possible to economically prevent additional expenditure and misunderstandings or interpretational leeway that may result in software failures or definitional problems. For example, it is possible that at a system supplier failure transmission no longer working if 20 failures occur at the same time and if the computer at the same time is at the control limit. On the other hand, SNMP protocols do not need to be programmed or adapted by the system supplier.

In other words: With SNMP the manager or the aircraft maintenance computer sends a message to the first device to be managed in order to obtain various types of information from the first device to be managed. In doing so, information about the second and third (and if desired even more) subnetwork components can be read out from the one and only description file, as the subnetwork components have been entered their data before into the central description file, which data is necessary for the management and maintenance of these devices, that are below the first device to be managed. Therefore it is e.g. possible to get all failure messages of the subnetwork components with only one SNMP request. This has the consequence to be able to do away with an encoded protocol because the SNMP protocol is integrated on the aircraft-maintenance-computer side.

This exemplary embodiment provides a further advantage in that hitherto necessary pulsing of failure messages and thus additional programming expenditure can be avoided. Inquiries can now be controlled centrally by the manager, with the network components and subnetwork components merely providing the corresponding information.

Furthermore, the description file can be defined for special applications for failure messages in the aircraft.

It should be pointed out explicitly that a multitude of first devices to be managed and/or a multitude of second devices to be managed can be present as network components or subnetwork components respectively.

Furthermore, it should be mentioned that in the context of this invention each communication between the aircraft maintenance computer and the first devices to be managed is carried out by means of the SNMP protocol unless otherwise described.

The communication between the first and second devices to be managed does not necessarily have to be via SNMP. Subnetworks do not have to be based on SNMP. The present invention makes it possible, that also non SNMP devices (as second devices to be managed) can be integrated in the network of the first device to be managed and that they can be recorded, registered and entered in the MIB of the system computer (as first device to be managed).

In this arrangement it is possible, for example, to use an OID that has been specified in a completely fixed manner.

According to this exemplary embodiment of the invention it is also possible to provide functions by the network management system, which functions treat classical network problems of the network components such as switches, routers, AFDXs or Ethernet controllers analogous to a network card in computers. To this effect the description file of these controllers can comprise network-relevant files such as the number of lost packets, the number of faulty packets, the duration of operation, or information relating to the buffer memory.

In addition to the above, the description file (MIB) according to the invention can comprise more than this. It can, for example, comprise information relating to different failures in the network and/or in the subnetwork including the comprised components.

In other words this embodiment makes it possible for the aircraft maintenance computer to get failure information about the whole network and subnetwork with only one request from the aircraft maintenance computer at the description file in the first device to be managed. This data of the subnetwork components is successively collected by entering the relevant data into the description file.

According to another exemplary embodiment of the invention the first device to be managed is an Flight Entertainment System (IFE) and the second device to be managed is chosen from the group comprising seat actuation, On-board Mobile Telephone System (OMTS), In-Seat Power Supply System (ISPSS), electronical component for entertainment, and any combination thereof.

The IFE is besides the avionic network (AFDX) and the Cabin Intercommunication Data System (CIDS) the largest network within an aircraft. The IFE uses SNMP to communicate with the aircraft maintenance computer. Thus the IFE is a first device to be managed. An advantage of this embodiment of the invention is, that the existing IFE network is used for the integration of subsystems like e.g. OMTS, ISPSS, and TV data transceiver. Referring to the communication between the IFE and the second device to be managed, this integration can be done by means of SNMP or other protocols. In other words by means of this exemplary embodiment of the invention two systems are combined and thus controllable, manageable and maintainable that have before been treated only separately. This may lead to cost reduction for an aircraft user. Furthermore a simplification of network management may be provided by the invention.

According to another exemplary embodiment of the invention the first device to be managed is a Cabin Intercommunication Data System Director (CIDS DIR), and the second device to be managed is a Cabine Intercommunication Data System (CIDS), that comprises components that are chosen from the group comprising Decoder-Encoder Unit for converting a CIDS protocol into a CAN protocol, Ice Protection Control Unit (IPCU), Potable Water System (PWS), Vacuum Toilet System (VTS), Galley Network Control System (GNCS), subnetwork component of the galley, Cabin Illumination (CIL), Emergency Power Supply System (EPSU), Control Sunlight Blocking System (CSBS), and any combination thereof.

An advantage of this embodiment may be that no special protocol has to be programmed for managing and maintaining this combination of electronical components. During such a programming procedure, which is avoided by the present invention, failures may be implemented into the program. However, SNMP is used by the present invention for the communication between the first device to be managed and the aircraft maintenance computer. Furthermore this protocol does not have to be tested. Only the content of the MIB may have to be tested. This may safe time and cost when implementing devices in an aircraft network.

According to a further exemplary embodiment of the invention, the description file comprises a first part and a second part, wherein the first part is defined so as to be fixed, while the second part is adaptable to at least the first and second device to be managed.

The information of the description file is organised in the form of a tree topology whose individual branches can be represented either by numbers or, as an alternative, by alphanumeric designations. This chain of characters that comprises full stops and numbers is called an object identifier (OID), e.g. 1.2.3.0.

In this arrangement the first part of the description file comprises a generic structure that is predetermined. In the above-mentioned example this can, for example, be the structure that is represented by the first three digits 1.2.3. of the OID. In this way it is possible, for example, for the aircraft manufacturer to determine system requirements or network compatibilities which then have to be met by a system supplier in the lower part, in the present example the last digit. The first part of the OID thus determines the minimum elements and minimum functions of the second part. Thus the first part of each OID in the network to be managed is identical. In this arrangement the last digit of the first part of the OID determines the start position for the second, variable, part in the tree topology.

The second part of the OID, which corresponds to the second part of the description file, can then in each case be adapted to the corresponding device or to the corresponding network component or subnetwork component. For example, in the first part it may be determined that a system test or a device test needs to be able to be carried out on the device or devices to be integrated in the network. However, should a device require for example two device tests, then the variable second part of the OID offers the option of integrating the functionality of two device tests in the OID. In this arrangement it is possible, for example, for data of two device tests to be filed in the description file. In this arrangement the value of the digit in the second part of the OID corresponds to a region which depending on the device can be flexibly occupied by a functionality or a characteristic of the given device. By means of an additional description file the occupation of the regions can then be stated. Furthermore, based on the second part of the description file the manager of the network can be configured. Addressing the respective device may take place by means of the IP address.

The OID describes the starting point for a data region that can be indicated. The number of possible failures is, for example, predetermined by an index (n). The manager can then use this index to query entries under the OID 'System failures' until the value (n) has been reached. The MIB only describes the data structure, and if an index is used there is no limit to a maximum element number, e.g. a maximum number of failures. Thus in the case of changes of devices with new, further, failure messages the MIB need not be changed. The index is simply increased by the number of the additional failure messages. The manager is thus always informed about the total number of possible failure entries.

With this exemplary embodiment of the invention the tree topology of a description file can be separated into a first part and a second part. In this arrangement the first part can, for example, be defined by a user, e.g. the aircraft operator or aircraft manufacturer. In this arrangement the first part, which has been defined by the first user, can be used, for example, in order to file companies or safety standards. In a second, lower, part of the tree topology of the description file a second user, for example the manufacturer of a second device to be managed, can make adjustments according to the technical specifications of the given device. In this arrangement the first part of the file is predetermined so as to be unchangeable by the second user.

The division of the description file into two parts results in an extremely flexible application of the description file to a broad spectrum of devices to be managed in the network and/or the subnetwork. In this arrangement an aircraft manufacturer or operator can create a standard for managing a network in an aircraft while at the same time provide flexible adaptation to various devices to be managed.

In this arrangement the division of the description file into two parts can be implemented as follows: the tree topology can, for example, from the initial path up to a certain level be determined by the manufacturer or operator of an aircraft. Below this level in the tree topology, any changes by a device provider can be called up only after particular commands.

The above can furthermore result in fewer updates being necessary for the network to be managed.

In other words the description file is adaptable, by means of the second part, to the software that runs on the device to be monitored.

According to a further exemplary embodiment of the invention, placeholders are entered in the regions that are indicated by the second part of the description file. Furthermore, for each device to be managed a configuration file is provided in which the significance of the placeholders is defined.

This makes it possible to implement simplified configuration and integration of devices and subsequent changes in the network.

For example, a failure can be indicated with a 4096 number. The significance of this failure is then determined in the separate list, the configuration file. This can be associated with an advantage in that in the case of changes, e.g. as a result of an exchange of devices, it is not necessary to always alter the description file; instead it is only necessary to update the configuration file. In this arrangement in each case a configuration file corresponds to a device to be managed.

In other words, the description file can be considered a dynamic, indicated description file. It is thus not necessary for all the fields to be indicated that have already been described beforehand. However, in the case of failure messages and system configuration files it is very sensible. Statistical MIB components thus represent a special case with index=1.

According to a further exemplary embodiment of the present invention, the description file furthermore comprises information for identifying a device to be managed.

In order to make it possible to identify the device or devices to be managed, the description file comprises information for identification. For example an IP address, an Ethernet MAC address or a so called BITE identifier.

In other words the network management system can be brought to an identification mode in that each device of network management sends its identification data to the manager or to the aircraft maintenance computer.

However, targeted active querying of identification information of a device network by the aircraft maintenance computer is also possible.

A so-called subsystem index instead of a BITE identifier is also possible. A BITE identifier must be allocated so as to be fixed; in contrast to this an index is flexible and requires less management effort.

According to a further exemplary embodiment of the invention, the description file comprises a first failure table, information relating to the current function state of device to be managed, and a second failure table. In this arrangement, in the first failure table failures that have occurred before the runtime of the system are stored, while in the second failure table failures that have occurred since the beginning of the runtime of the system are stored.

In this arrangement the first failure table and the second failure table can be identical. This exemplary embodiment of the invention describes a so-called normal mode of the network management system. Furthermore, the description file comprises a sub-branch called "Current function state" of the device to be monitored. In this arrangement a parameter is provided that makes it possible for the manager or the aircraft maintenance computer to query the current function state of each device in the network or in the subnetwork. In this arrangement this parameter indicates whether or not the system is in a functional state. Furthermore, the description file comprises a sub-branch in which the failures that have occurred since the beginning of the runtime of the system are stored. In this arrangement the above-described system of the dynamic, indicated description file can be used for the failure tables.

According to a further exemplary embodiment of the invention, the aircraft maintenance computer is adapted in such a way that at least one of the devices to be managed can be caused to carry out a test. Furthermore, this at least one device is adapted in such a way that it carries out the caused test and that it stores the test results in the description file of the first device to be managed.

Due to this implementation of the test function by means of SNMP in the network management system the use of special test equipment for each individual device in the network can be minimised. This serves to further reduce costs and to reduce weight in the aircraft.

Furthermore, in addition, so called BITE systems, in other words built-in test equipment, can be used for the tests.

According to a further exemplary embodiment of the present invention, the device to be managed is selected from the group comprising an entertainment system for an aircraft; a communication system for an aircraft; a video monitoring system for an aircraft; navigation devices; radio devices; radar devices; air conditioning devices; devices to supply energy, water and waste water; kitchen devices; computers; printers; routers; and switches.

Individual devices or several of these devices can thus be simultaneously managed, monitored and tested by the network management system or the aircraft maintenance computer. In this arrangement, narrowing down and confirmation of a failure can take place by the aircraft maintenance computer. In this context, for example, an in-flight entertainment system, a cabin intercommunication data system or a cabin video monitoring system are of special interest.

According to a further exemplary embodiment of the invention, a single description file is used for a class of devices.

Furthermore, it is possible for the description file (MIB) to be equipped specifically for a class of devices, e.g. for the "printer" class.

According to a further exemplary embodiment of the invention, the network management system furthermore comprises a troubleshooting file. Furthermore, the aircraft maintenance computer is adapted in such a way that in the case of an exchange of failure information with a device to be managed, troubleshooting takes place on the basis of the troubleshooting file.

In this arrangement the troubleshooting file can, for example, be designed as a troubleshooting manual of a device. A multitude of troubleshooting files are also possible. This makes it possible for the aircraft maintenance computer or the manager on the aircraft maintenance computer to obtain from the troubleshooting file information for remedying the detected failure in the device. In other words, by means of the aircraft maintenance computer additionally built in test equipment that is installed optionally each device to be managed in the network and the subnetwork can be repaired.

According to a further exemplary embodiment of the present invention, the aircraft maintenance computer is adapted in such a way that different exchanged failure information can be correlated.

In other words, the aircraft maintenance computer is in a position to establish causal relationships among, for example, failures that occur in different devices in the network and the subnetwork. For example, it is possible, by means of a file, to provide the aircraft maintenance computer with information as to the way the individual devices interact within the network. Likewise, correlation between failures of one and the same device can take place by means of the computer.

According to a further exemplary embodiment of the present invention, a method for managing and maintaining a network and a subnetwork in an aircraft with a network management system is provided. The method comprises the following steps:

providing for network within the aircraft, providing for subnetwork within the aircraft, wherein the network comprises an aircraft maintenance computer and at least one first device to be managed, which comprises a description file. The subnetwork comprises a second device to be managed. The aircraft maintenance computer is adapted for managing and maintaining the first and the second device to be managed. The method further comprises the step of exchanging information or data of the description file between the aircraft maintenance computer and the first device to be managed via SNMP, and transmitting information or data from the second device to be managed to the description file of the first device to be managed, wherein the data of the second device to be managed is necessary for the management and the maintenance of the second device to be managed, whereby the exchange of information between the aircraft maintenance computer and the first device to be managed via SNMP enables the aircraft maintenance computer by means of only the description file to manage and maintain both devices to be managed.

It should be noted that the subnetworks do not have to be based on SNMP. It is an aspect of the invention that e.g. failure messages of the second devices to be managed are entered or registered in the central MIB of the first device to be managed. In other words in this and in any other exemplary embodiment of the invention any kind of subnetworks are integrable into the network. They are registered, summarized or collected in the MIB of the system computer, which is the first device to be managed.

In other words this method avoids the use of a user-defined specific protocol for managing a network. In this arrangement text-based failure messages and coded messages are not mandatory. Based on the use of the SNMP protocol in the special field of aircraft network management the technical risk of specific protocol solutions of each device to be managed can be avoided. Furthermore, the programming effort can be minimised. Since the exchange of information can also include tests, special test devices can be avoided. Likewise, minor modifications of the devices to be managed can simply and flexibly be integrated in the description file. In this arrangement the exchange of information can, among other things, refer to sending and receiving identification information of the device, sending a test request, sending test results, sending and receiving failure messages, and sending and receiving updates by means of SNMP.

According to a further exemplary embodiment of the invention, the method further comprises the steps of: defining a first part and a second part of the description file, adapting the first part of the description file to the network management system, and adapting the second part of the description file to the device to be managed.

By means of this two-part embodiment of the description file it is possible to ensure that, for example, the operator of the network carries out his system requirements and safety requirements in a first part of the description file, which first part cannot be changed. The second part of the description file can then, for example, be specifically adapted, by a manufacturer of a second device to be managed, to this device that is to be integrated in the network or subnetwork. In this way improved flexibility is provided, while at the same time adherence to the specifications of the network operator is ensured. In this way safety in the aircraft can be improved because as a result of there not being any programming requirements by the manufacturers, the risks of programming errors contributing to unsafe situations in the aircraft can be reduced.

According to a further exemplary embodiment of the invention, the method further comprises the following steps: querying information of the description file for identification of a device by the aircraft maintenance computer; sending the information of the description file for identification of this device by the first device to be managed to the aircraft maintenance computer; querying a first and a second failure table of the description file by the aircraft maintenance computer; sending the first failure table and the second failure table by the first device to be managed to the aircraft maintenance computer. In the first failure table failures that have occurred before a runtime of the system are stored, while in the second failure table failures that have occurred since the beginning of the runtime of the system are stored. This exemplary embodiment further comprises the steps of querying information of the description file concerning a current function state of a device to be managed by the aircraft maintenance computer, and sending the information concerning a current function state of the this device by the first device to be managed to the aircraft maintenance computer.

In this arrangement any communication of these process steps takes place by means of the SNMP protocol. In this arrangement this exemplary embodiment describes a method for implementing the so-called normal mode of the network management system, which normal mode will be described in more detail below.

According to a further exemplary embodiment of the present invention, the method further comprises the steps of initiating a test in a device to be managed by the aircraft maintenance computer; carrying out a test by this device, which test corresponds to initiation; and transmitting, by the first device to be managed, results of the test to the aircraft maintenance computer.

By means of this method it is possible to avoid additional expensive test devices in the network.

According to a further exemplary embodiment of the present invention, an aircraft with a network management system is provided.

According to a further exemplary embodiment of the present invention, the use of a network management system in an aircraft is provided.

Further exemplary embodiments and advantages of the invention are provided in the following description of the figures. However, the invention is not limited to these exemplary embodiments.

The illustrations in the figures are schematic and not fully scaled. Furthermore, steps can be carried out within the method. Reference signs are explicitly to be interpreted as being non-limiting.

BRIEF DESCRIPTION OF THE DRAWINGS

Although the invention herein

Below, preferred exemplary embodiments of the present invention are described with reference to the figures.

In the following description of the figures, the same reference signs are used for identical or similar elements.

Figure 1:
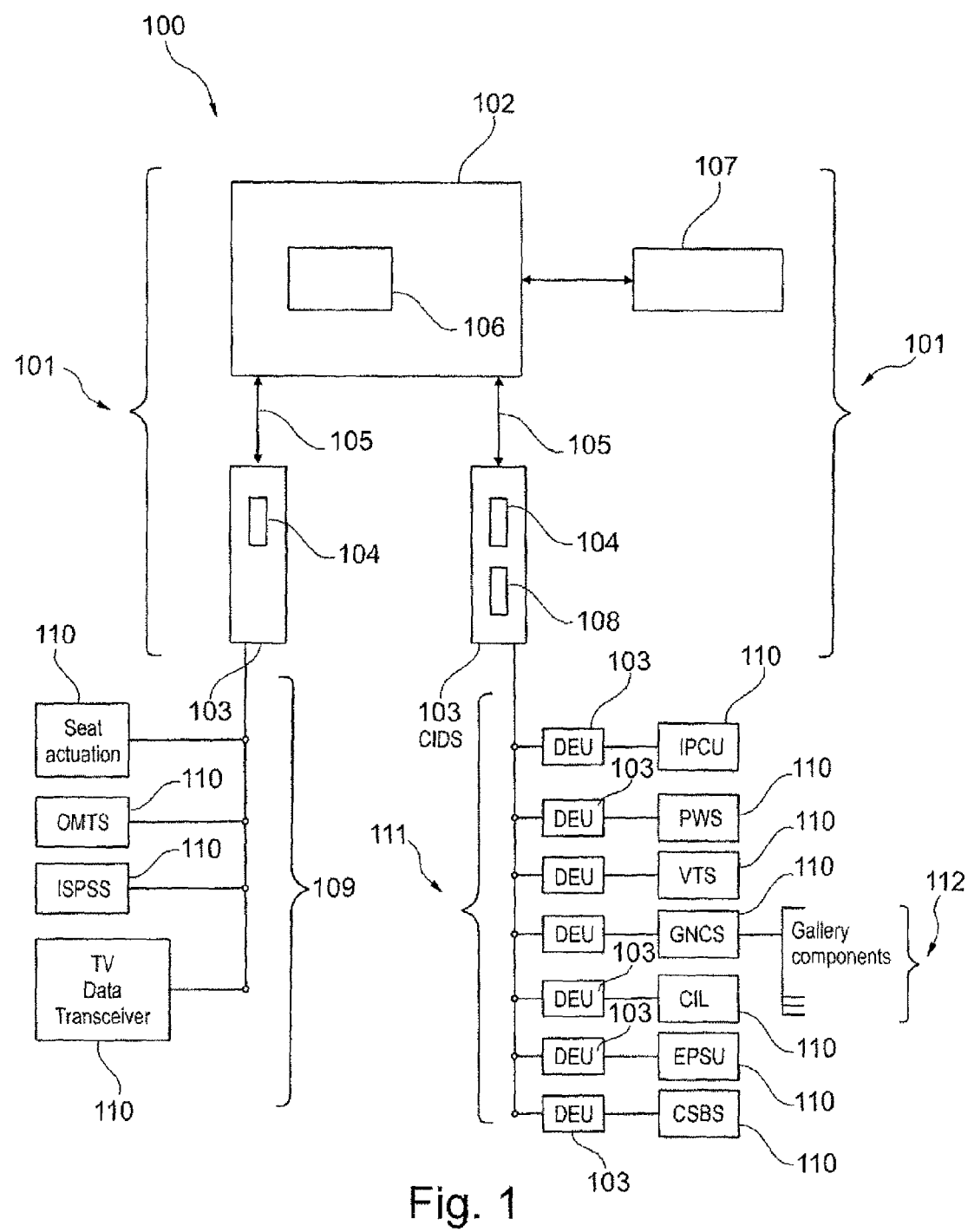
FIG. 1 shows a schematic two-dimensional view of a network management system according to an exemplary embodiment of the present invention.

FIG. 1 shows a network management system 100 in an aircraft, in which system a network 101 on the left and a network 101 on the right of FIG. 1 is managed and maintained by the aircraft maintenance computer 102 according to an exemplary embodiment of the invention. The network on the left 101 comprises a first device to be managed 103, which comprises a central description file 104 (MIB). The shown aircraft maintenance computer 102 comprises the manager 106 or a management program 106. By means of the Simple Network Management Protocol (SNMP) it is possible for the aircraft maintenance computer 102 to access the description file 104. By means of this protocol and additionally by the communication between the first 103 and second 110 devices to be managed it is possible not only to cause monitoring, remote control, remote configuration, failure detection and failure notification, but also to carry out tests on the devices 103 and 110 by the aircraft maintenance computer.

The network shown on the left additionally comprises as subnetwork components the second devices to be managed 110. Within the description file 104 entries of the second devices to be managed 110 are stored, which entries are accessible for the aircraft maintenance computer 102 via an SNMP request and can thus be read out from the file 104. Accordingly the file describes or defines, which values or parameters of the network components and subnetwork components can be read out by the aircraft maintenance computer. For the communication between the aircraft maintenance computer and the first device to be managed and thus fur such a request SNMP 105 is used.

The four different second devices to be managed 110 of the left network are embodied as a seat actuation, an On-board Mobile Telephone System, an In-Seat Power Supply System and as electronical components for entertainment. The first device to be managed of the left network is realized as an In-Flight Entertainment System (IFE).

The shown network on the right hand side 101 comprises a second subnetwork 111, which in turn contains a third subnetwork 112. It should be noted that the coding and decoding unit (DEU) is part of the first device to be managed and is thus referenced with the sign 103. An important aspect of this embodiment of the invention is also that for managing and maintaining the whole network only the central MIB 104 in the first device to be managed on the right is comprised in the network. Other MIBs are not necessary. Via various communication paths, which may deviate from a SNMP realization, all second devices to be managed of the network on the right enter their entries into the MIB 104. Thereby the shown abbreviations are used as follows:

DEU describes Decoder-Encoder Unit, IPCU describes an Ice Protection Control Unit, PWS describes a Potable Water System, VTS describes a Vacuum Toilet System, GNCS describes Galley Network Control System, CIL describes a Cabin Illumination System, EPSU describes an Emergency Power Supply System and CSBS describes a Control Sunlight Blocking System.

By means of the invention the failure status of all second devices to be managed 110 can be entered into the central MIB 104, which entries can be requested, if desired, by the manager. This may lead to a data flow reduction, as not each and every second device to be managed has to transmit independently and unsolicited its failure status permanently. In other words during a read out of the MIB done by the aircraft maintenance computer the whole desired information (e.g. failure status) of all second devices to be managed 110 of the respective subnetwork can be requested at once. Furthermore it is possible to send subsequently a request or demand for failure compensation or maintenance by the aircraft maintenance computer.

Furthermore, for example for monitoring the devices, so-called agents 108 can be used. These are programs that run directly on the devices to be monitored. These programs are in a position to acquire the state of the devices. By means of this network management system it is possible for the central management station, i.e. the aircraft maintenance computer, to communicate with the agents by way of the network 101. Therefore there are different data packets that can be sent, for example Get, Get next, Get bulk, Set, Response, or Trap.

In this arrangement each description file 104 can be adapted in two parts, wherein the first part is predetermined, so as to be fixed, by the user or operator of the network. In contrast to this, the second part can be specifically matched to the respective device by a manufacturer or a supplier of a device 103. With such a creation of a communication standard for managing, monitoring and troubleshooting a network by way of the aircraft maintenance computer 103, lower integration costs can be achieved. Moreover, the use of special test equipment for each specific device can be avoided. This results in a large user community, and the use of commercial devices which up to now was tantamount to very considerable programming expenditure can easily be implemented.

Figure 2:
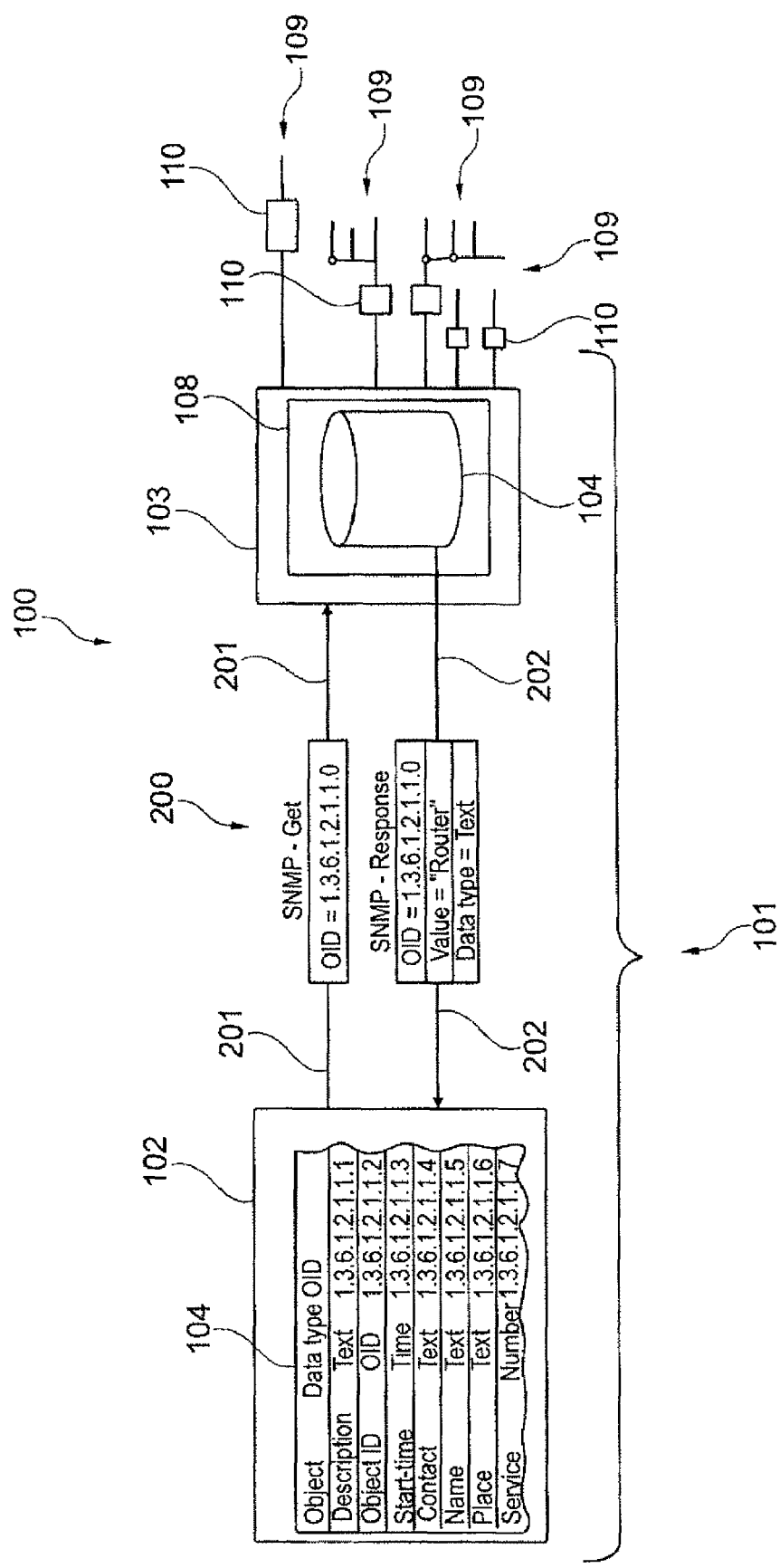
FIG. 2 shows a schematic two-dimensional view of communication between an aircraft maintenance computer and the first device to be managed and communication between the first and second devices to be managed, according to an exemplary embodiment of the present invention.

FIG. 2 shows a schematic view of a communication by means of SNMP between a first device to be managed 103 and an aircraft maintenance computer 102. Furthermore a substructure below the first device to be managed 103 is shown, which comprises several subnetworks 109. In this substructure several subnetwork components are shown.

In this arrangement the aircraft maintenance computer can, for example, be designed as a server on which various applications are running: SNMP manager, client management systems (CMS), application programming interface (API), SNMP-CMS and others. The diagram shows an SNMP query 201 of the aircraft maintenance computer to the first device to be managed, as well as an SNMP reply 202 of the first device to be managed. The diagram shows various entries in the troubleshooting file 104, which entries can be requested as information by the maintenance computer.

Figure 3:
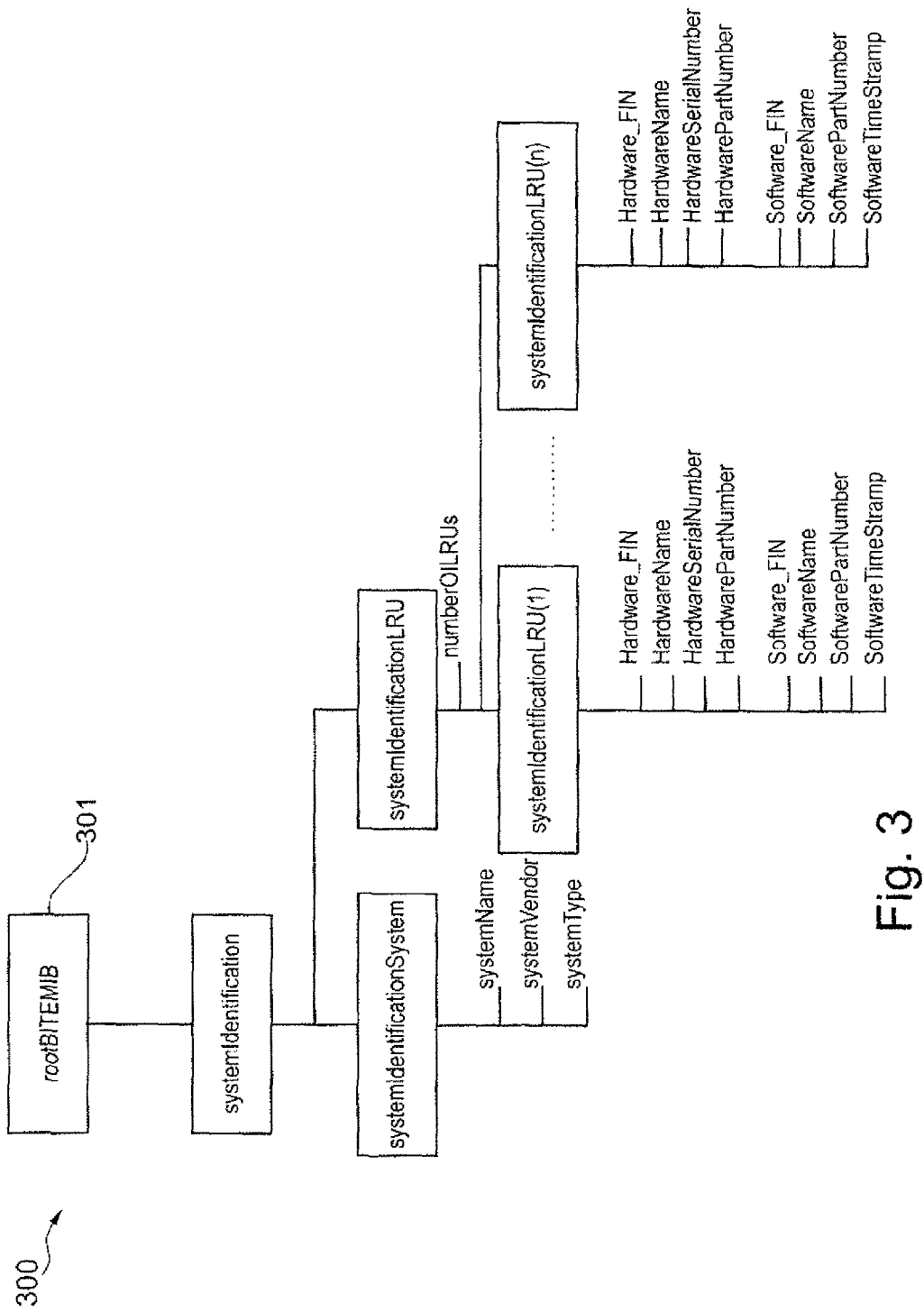
FIG. 3 shows a tree topology of a description file according to an exemplary embodiment of the present invention.

FIG. 3 shows a schematic view of an exemplary tree topology of a description file (MIB) to identify a device of the network.

Figure 4:
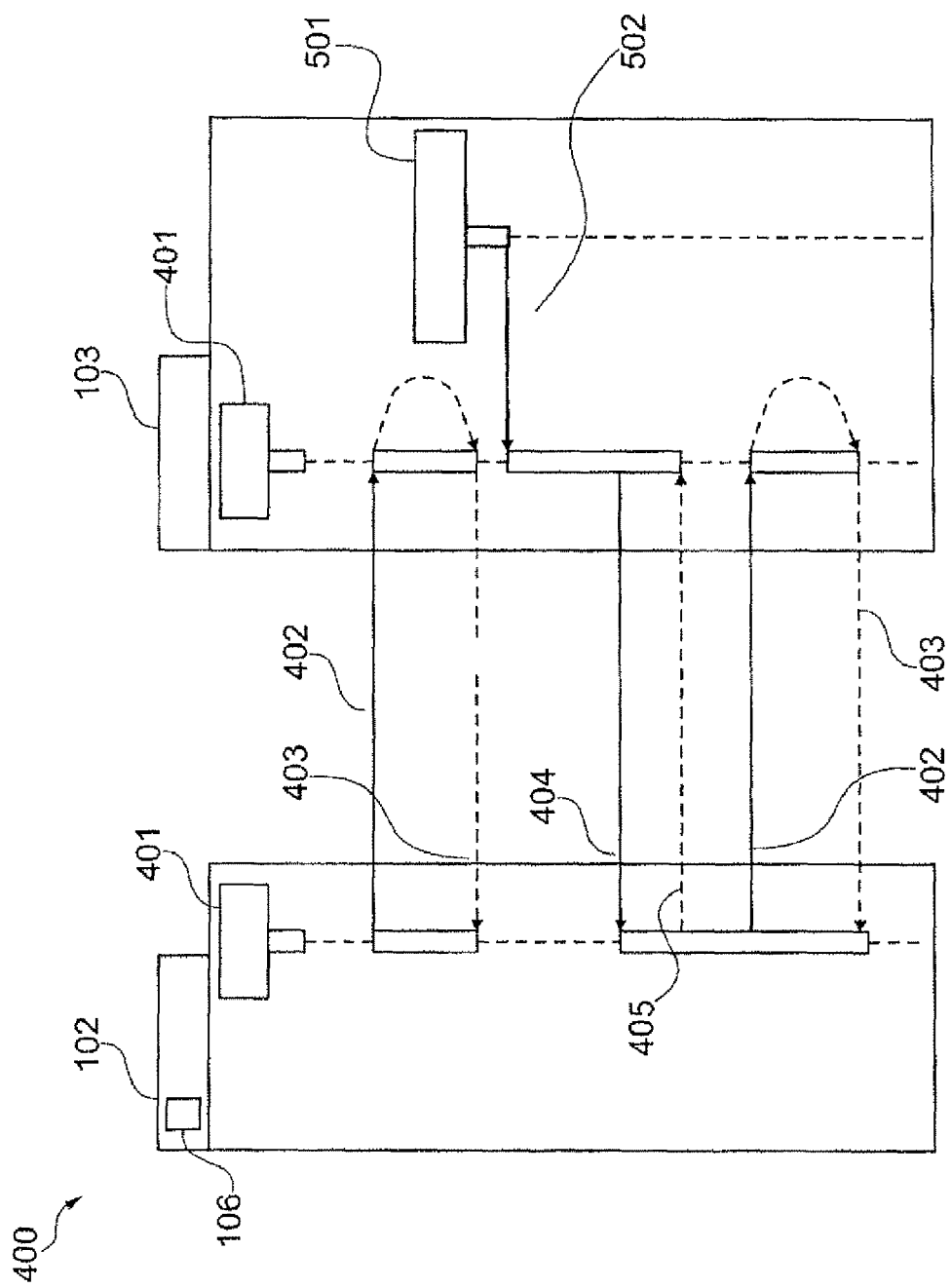
FIGS. 4 to 7 show communication sequences according to an exemplary embodiment of the present invention.

FIG. 4 shows a communication sequence between the first device to be managed 103 and an aircraft maintenance computer 102 for device identification during a configuration change 501 of the device. The diagram shows querying of identification information 402 and sending of identification information 403. After a change in the configuration of the system or of the first device to be managed 103 this is stated 404 and perceived by the aircraft maintenance computer 102. A subsequent query relating the new configuration 405 is also shown. In this arrangement, in addition, built-in test equipment 401 can be present in the aircraft maintenance computer and also in the first device to be managed 103. In this arrangement the built-in test equipment (BITE) can cause tests to be initiated and implemented. This configuration change can be in the first as well as in the second device to be managed. Both is possible. A change in the first device to be managed would e.g. be the addition of a DEU (see FIG. 1). The addition of a galley component 112 would be a configuration change in the second device to be managed (one network or subnetwork layer below). In any case the first device to be managed needs the information about such a configuration change, in order to enable the aircraft maintenance computer to request information from new devices, identify failure or also to note when a wrong configuration has happened.

Figure 5:
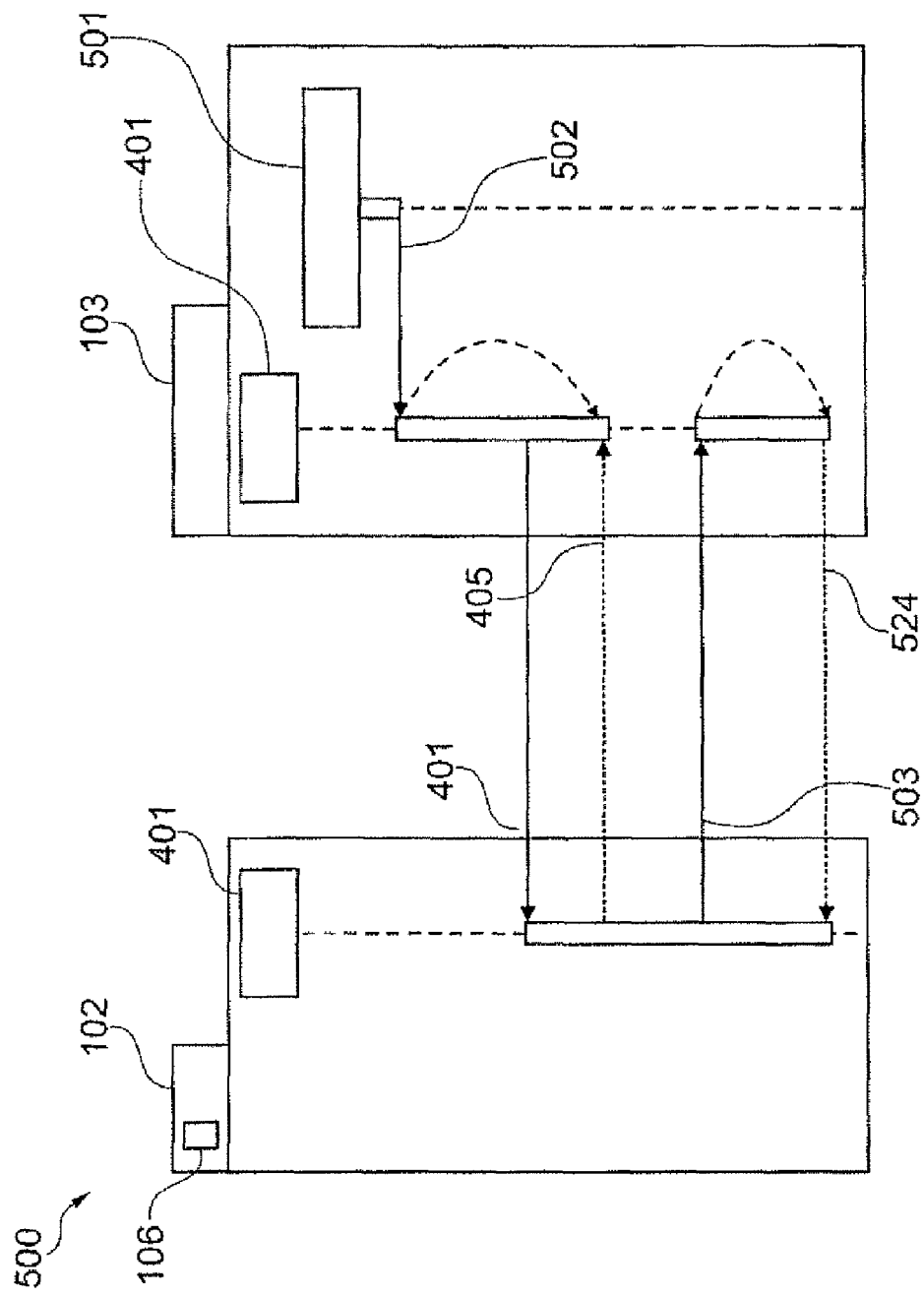

FIG. 5 shows a communication sequence in the normal mode, in which a failure table is requested by the aircraft maintenance computer 102. This request is designated 503. In this arrangement the first device 103 to be managed sends the failure table to the aircraft maintenance computer. Such sending is designated 504. In normal mode this process takes place, for example, after a configuration change 501.

Figure 6:
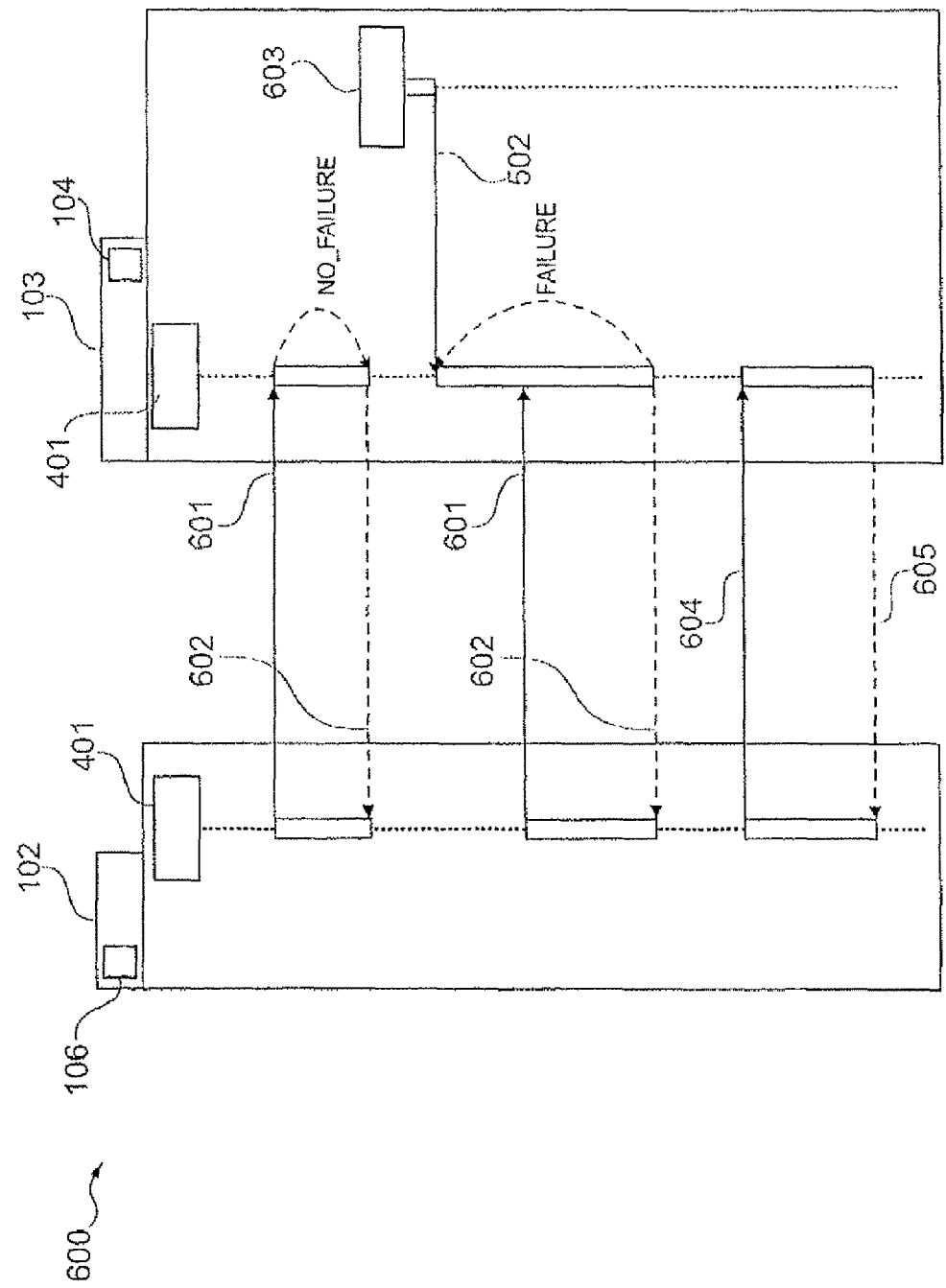

FIG. 6 shows a communication sequence 600 to verify the current function state after a failure has occurred. The vertical direction from the top to the bottom of FIG. 6 describes a timeline, in which events shown on the top had happened before events that are shown below. In this arrangement communication between the aircraft maintenance computer and the first device to be managed takes place by means of the SNMP protocol. In this context, the querying 601 and the sending 602 of the current function state by the first device to be managed are shown. Before that, the second device to be managed 110 of the subnetwork 109 (both not shown in FIG. 6) has entered its failure message into the central MIB, that is stored in the first device to be managed. In case a request of the aircraft maintenance computer 102 occurs, the stored failure message is transmitted via SNMP to the aircraft maintenance computer 102. Thus the current status of the second device to be managed is entered or stored in the MIB and then reported to the manager.

In case of a failure 603, which may occur in the first a well as in the second device to be managed the current status of the corresponding device is requested 601 by the aircraft maintenance computer 102 and/or it is sent by the first device to be managed 602.

In case that the first 103 or second 110 device to be managed e.g. does not answer, one can conclude, that a failure or problem is present.

In case that the failure 603 occurs in the second device to be managed 110, the second device to be managed delivers corresponding information to the first device to be managed 103. This information can initially be sent by the second device to be managed or can be requested by the first device to be managed. Often the devices of the second layer are polled e.g. by means of CAN bus. In doing so the MIB 104 serves for the first device to be managed, put simply, as a stopover or intermediate station between the second layer (subnetwork) and the aircraft maintenance computer 102.

The advantages of such a communication 601 and 602 can be seen in the fact, that the manager can be specified centrally and at once for all first and second devices that are to be managed. Therefore a simplified configuration of the managing and maintenance parameters of the whole system is possible. The question how the whole system should be polled can be answered by centrally adjusting the manager. E.g. the temporal distances of different requests applied by the aircraft maintenance computer 102 thereby extracting information from MIB 104 can be set centrally. This may lead to cost reduction. By means of a SNMP request "getbulk" the whole desired entered information of the MIB can be get at once. But also a gradually or step by step read out of this data is possible by means of the "getnext" command of SNMP.

Figure 7:
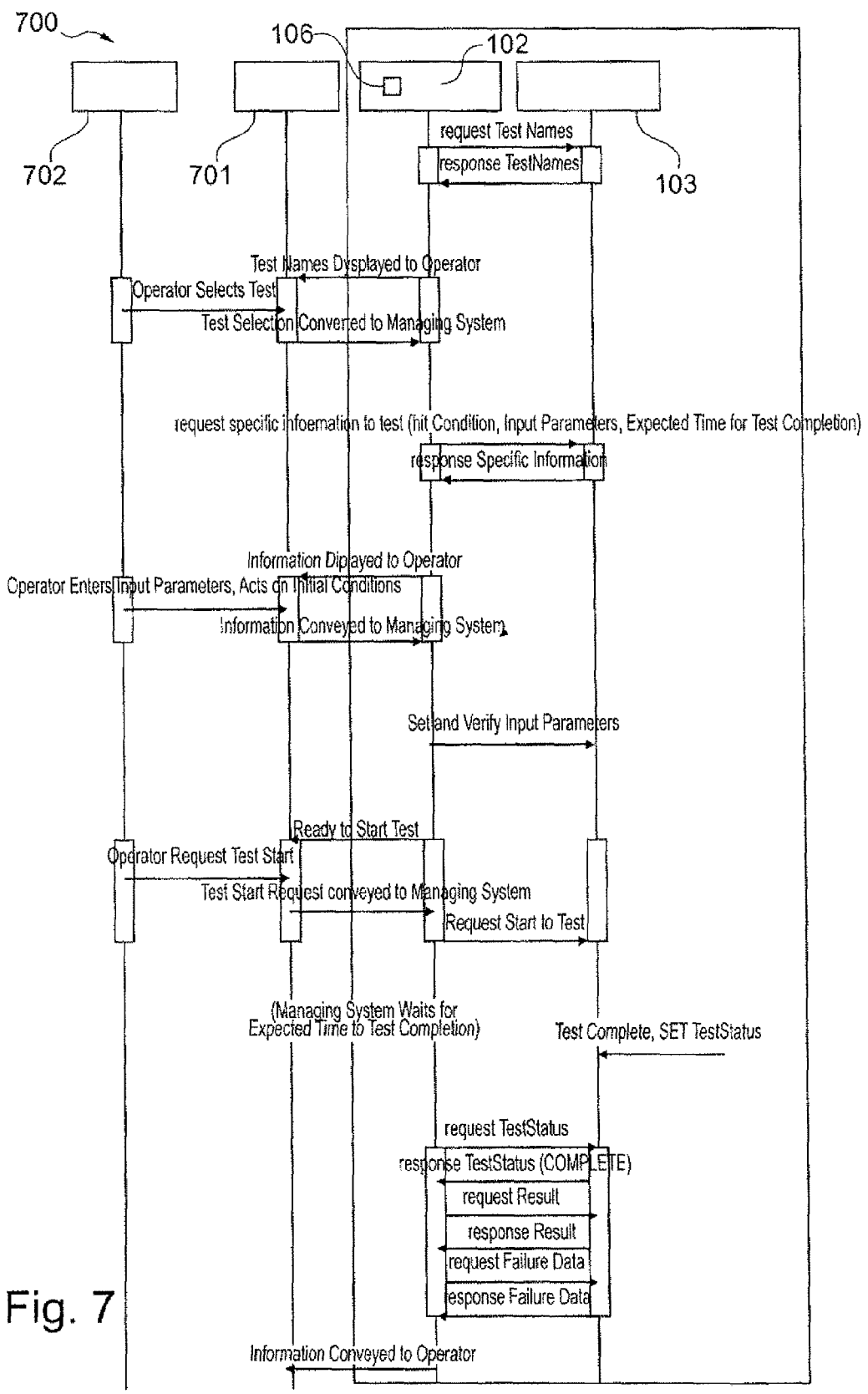

FIG. 7 shows a communication sequence during a test that can be caused, by the aircraft maintenance computer 102, by means of the SNMP protocol in the first device to be managed 103 or in the below lying subnetwork 109 or in a subnetwork component (not shown here).

Figure 8:
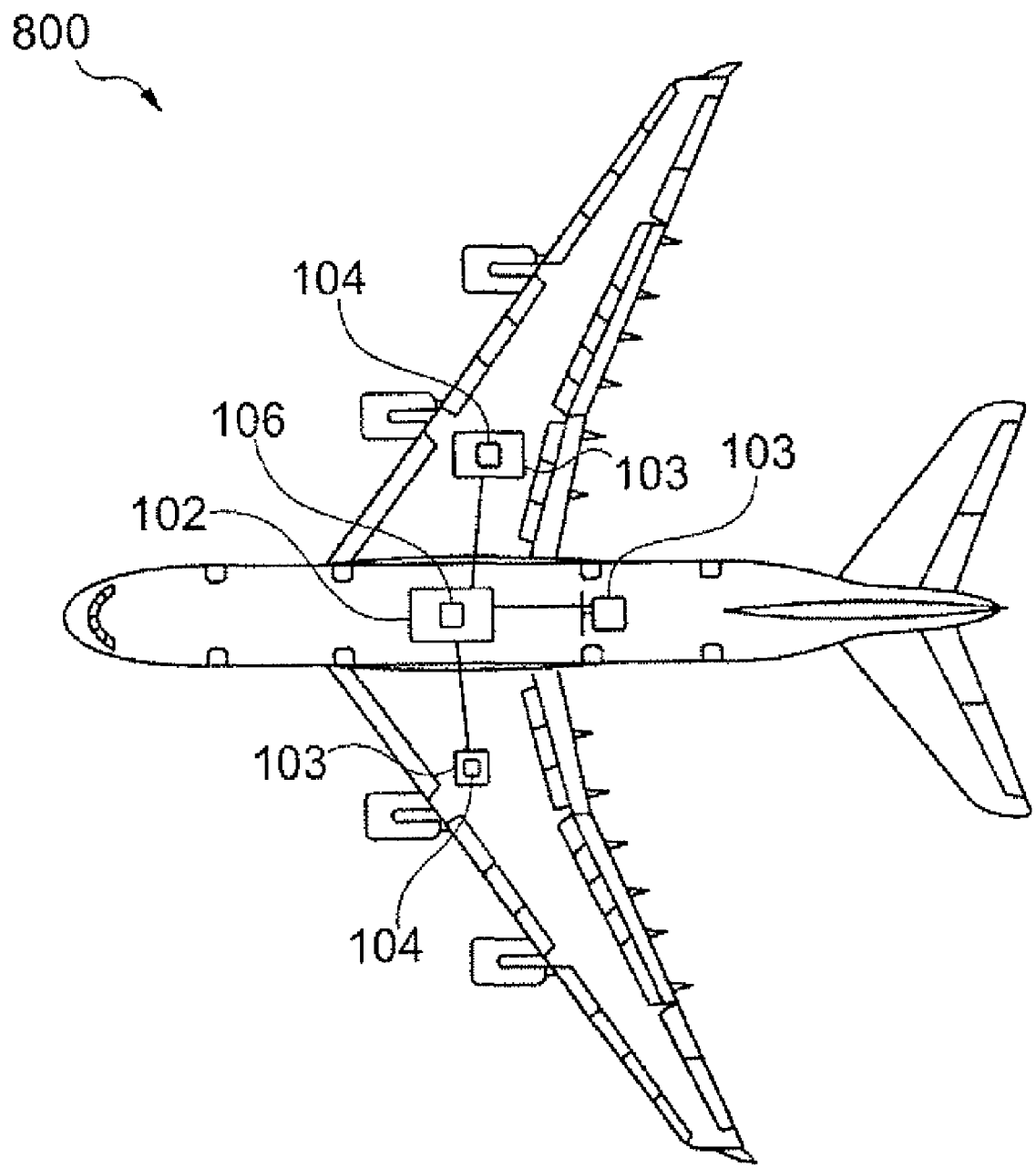
FIG. 8 shows a schematic two-dimensional view of an aircraft with a network management system according to an exemplary embodiment of the present invention.

FIG. 8 shows a schematic two-dimensional top view of an aircraft with a network management system according to an exemplary embodiment of the present invention.

Figure 9:
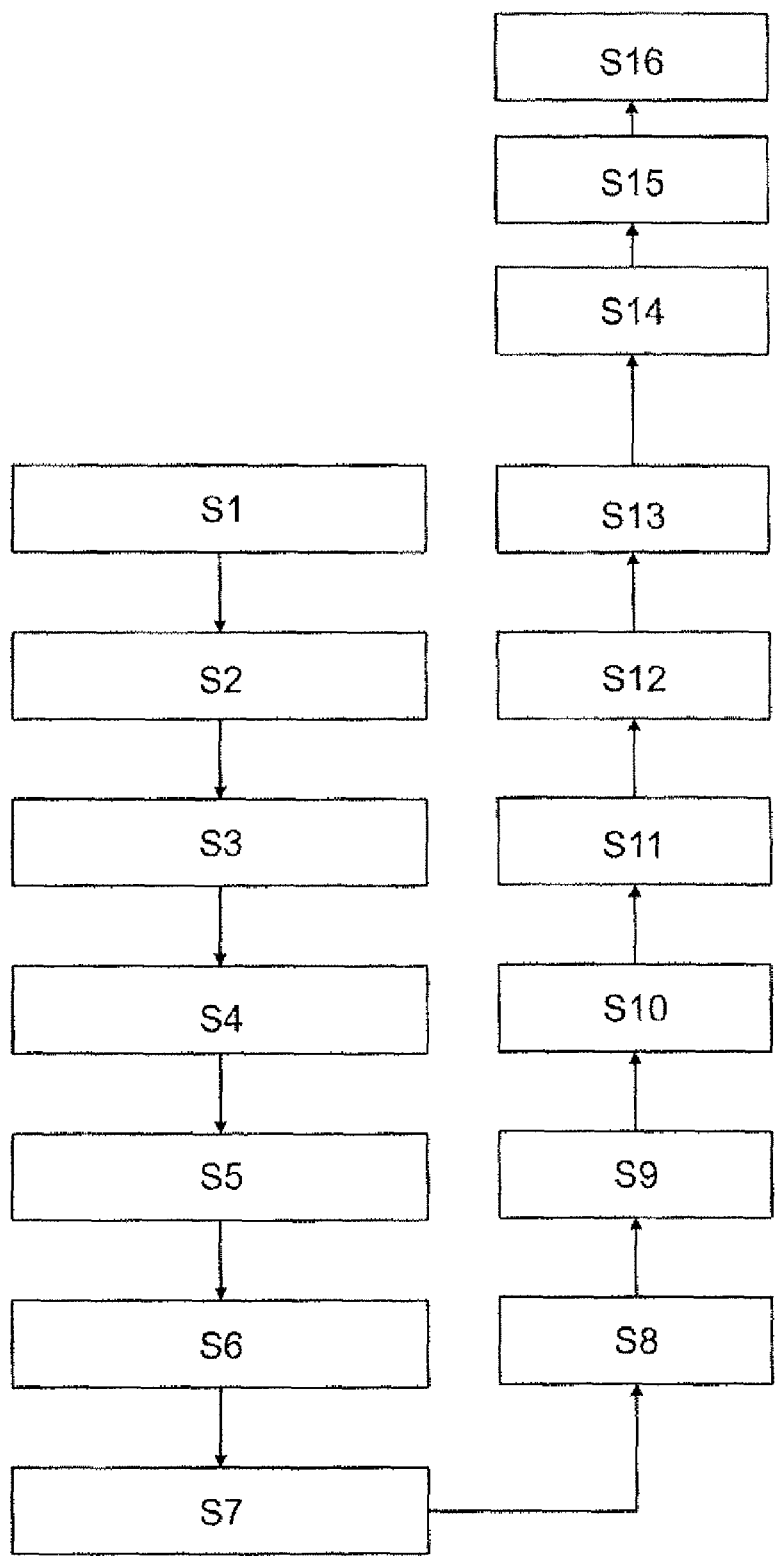
FIG. 9 shows a flow chart of a method according to an exemplary embodiment of the present invention.

FIG. 9 shows a flow chart of a method according to an exemplary embodiment of the invention. Steps S1 to S16 are shown.

Figure 10:
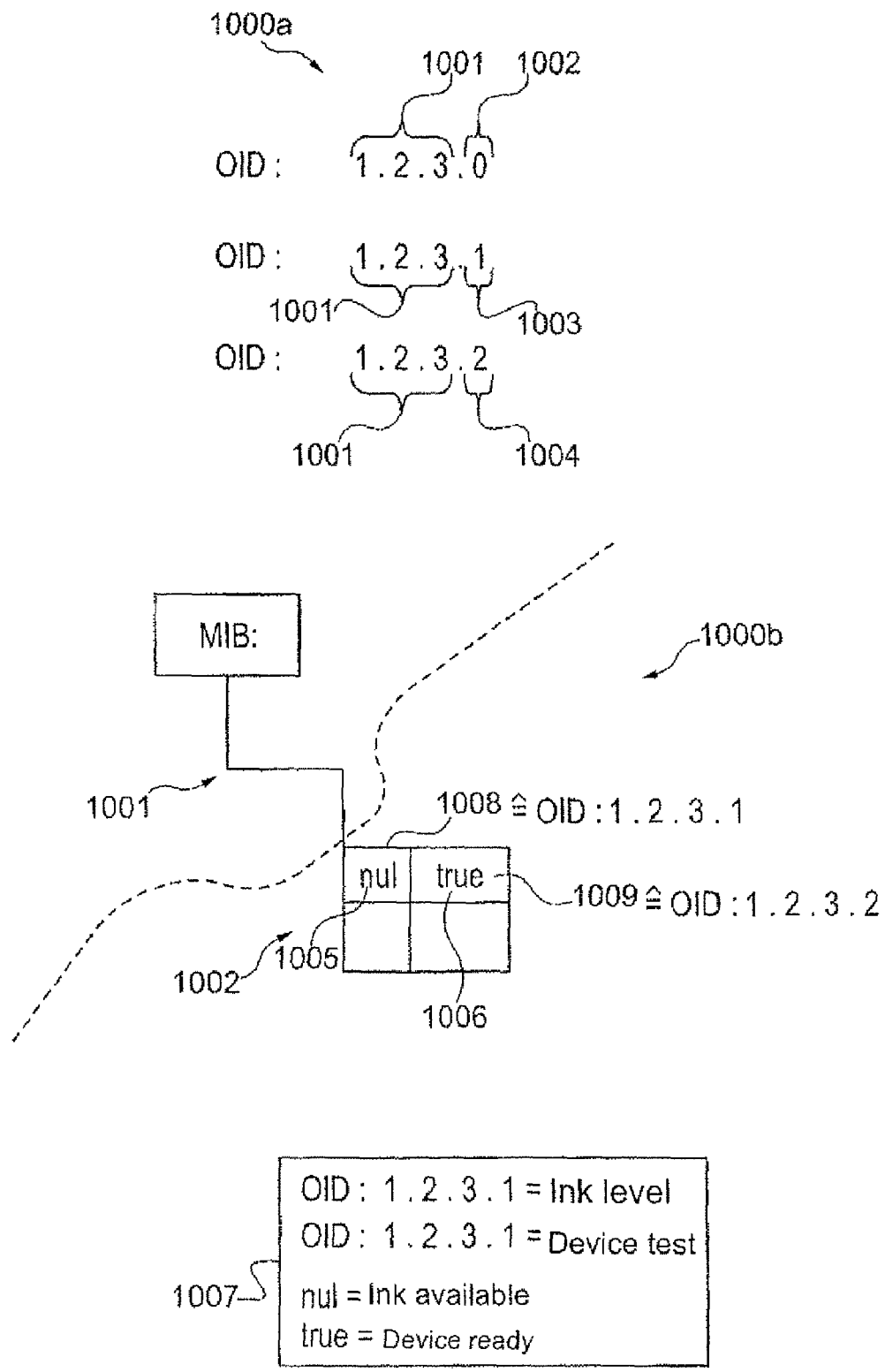
FIG. 10 shows a schematic view of an OID with a configuration file according to an exemplary embodiment of the present invention.

FIG. 10 shows an exemplary embodiment of a description file with an OID 1000a, as well as a schematic view of a structure 1000b that corresponds to the above. The description file comprises a first, generic, part 1001 of the structure, which structure is predetermined, in the first device to be managed, so as to be fixed for all the second devices to be managed (subnetwork components). In this way it is possible, for example, for the aircraft manufacturer to determine system requirements or network compatibilities that will then have to be met by a system supplier in the lower part 1002, in the present instance the last digit 0. Different values of the fourth digit 1003 and 1004 of the OID address other regions or areas 1008 and 1009 of the corresponding structure 1000b. In these regions corresponding placeholders 1005 and 1006 are entered, whose significance is defined in the configuration file 1007. These placeholders are dynamic; they vary over time. Likewise, the configuration file 1007 states what function is entered, for example in the field OID 1.2.3.1, e.g. the ink level. The placeholder <NUL> entered signifies in FIG. 10 that there is ink in the device associated with the description file shown.

In case the subnetwork has to be changed or its configuration is amended, only the configuration file has to be updated. An important advantage thereby is that by means of the command "getbulk" always the whole system status can be read out and obtained. Alternatively the SNMP command "getnext" can be used to reach the end of the list. However, the structure of the description file does not have to be amended. This may increase the integration capacity of the network in the aircraft and may avoid integration costs for the aircraft manufacturer. In other words subnetworks having a complex structure and various arrangements can more easily be integrated in the network and subsequently be managed and monitored via SNMP.

Figure 11:
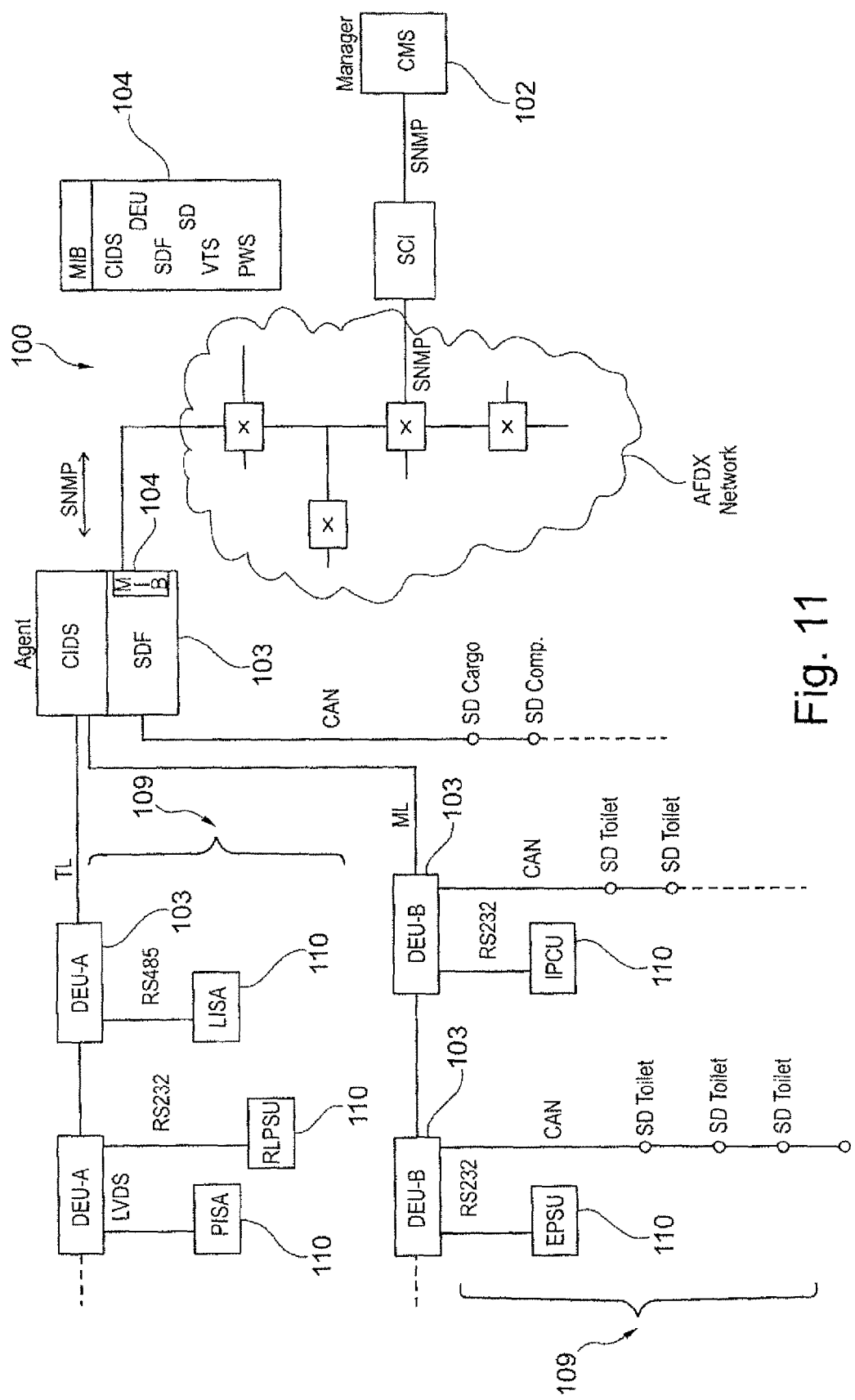
FIG. 11 shows a schematic two-dimensional view of a network management system according to an exemplary embodiment of the present invention.

FIG. 11 shows a network management system 100 in an aircraft in which an aircraft maintenance computer 102 (CMS, central management station) manages and maintains a first device to be managed 103 and also the underlying subnetwork components 110 of the subnetwork 109.

The coding and decoding units (DEU) are shown which are part of the first device to be managed and are thus referenced with sign 103. Due to the size of an aircraft these DEUS may be distant form the main devices that contains the MIB. The subsystems 109 begin afterwards. According to this exemplary embodiment of the invention the failure status is entered or stored in the MIB and the manager can, if desired, request or poll corresponding data. Various bus systems are shown: LVDS (Low Voltage Differential Signalling, CAN (Controler Area Network), RS232 (serial protocol), RS485 (serial protocol), ML (Mid Line Protocol), TL (Top Line protocol), AFDX (Avionic Full Duplex Ethernet).

In the light of the above said, this system is able to avoid, that each failure message has to be sent individually with one message by the corresponding failure component. By means of the invention the failure messages are collected, entered into a central MIB and only if desired transmitted to the central maintenance computer (CMS). The transmission from the first device to be managed to the aircraft maintenance computer is done via SNMP.

In addition, it should be pointed out that "comprising" does not exclude other elements or steps, and "a" or "one" does not exclude a plural number. Furthermore, it should be pointed out that features or steps which have been described with reference to one of the above exemplary embodiments can also be used in combination with other features or steps of other exemplary embodiments described above. Reference signs in the claims are explicitly not to be construed as limitations. Method-related steps can also be combined in an order or sequence that differs from that which is disclosed.

LIST OF REFERENCE CHARACTERS

100 Network management system
101 Network
102 Aircraft maintenance computer/CMS
103 Device to be managed
104 Description file (MIB) that corresponds to the device
105 Exchange of information of the description file between the device and the aircraft maintenance computer by means of SNMP
106 Manager
107 Troubleshooting file
108 Agent
109 subnetwork
110 second device to be managed
111 second subnetwork
112 third subnetwork
200 Communication by means of SNMP between the aircraft maintenance computer and the first device to be managed
201 SNMP query of the aircraft maintenance computer to the first device to be managed
202 SNMP reply of the first device to be managed
300 Tree topology of a description file (MIB) for identification of the device
301 Beginning of the tree topology
400 Communication sequence for device identification in the case of a configuration change
401 Built-in test equipment (BITE)
402 Querying identification information
403 Sending identification information
404 Stating a (new) configuration
405 Querying a (new) configuration
500 Communication sequence in the case of a configuration change in normal mode
501 Configuration change
502 Exchanging information
503 Requesting a failure table
504 Sending a failure table
600 Communication sequence in normal mode for monitoring the current function state after a failure has occurred
601 Querying the current function state of a device
602 Sending the current function state of a device

603 Occurrence of a failure
604 Failure query
605 Response to failure query
700 Communication sequence between the aircraft maintenance computer and the device to be managed in a test/interactive mode
701 Man-machine interface
702 Operator/user
800 Aircraft with network management system
S1-S16 Process steps

The invention claimed is:

1. A network management system for an aircraft for managing and maintaining a network and a subnetwork, the network management system comprising:
   the network;
   the subnetwork;
   wherein the network comprises:
   an aircraft maintenance computer;
   at least one first device to be managed, which first device to be managed has at least one description file;
   wherein the description file, the first device to be managed and the aircraft maintenance computer are configured to exchange of information between the aircraft maintenance computer and the first device to be managed is possible via SNMP;
   wherein the subnetwork comprises:
   at least one second device to be managed;
   wherein the aircraft maintenance computer is configured for managing and maintaining the first and the second device to be managed;
   wherein the second device to be managed is connected with the first device to be managed to enable the second device to be managed to transmit data that is necessary for management and maintenance to the description file of the first device to be managed;
   whereby the exchange of information between the aircraft maintenance computer and the first device to be managed via SNMP enables the aircraft maintenance computer by only the description file to manage and maintain the first and the second devices to be managed;
   wherein the first device to be managed comprises an In-Flight Entertainment System (IFE); and
   wherein the second device to be managed is chosen from the group comprising seat actuation, On-board Mobile Telephone System (OMTS), In-Seat Power Supply System (ISPSS), electronical component for entertainment, and any combination thereof.

2. The network management system of claim 1,
   with the description file further comprising:
   a first part and a second part;
   wherein the first part is defined so as to be fixed; and
   wherein the second part is configured to at least the first and second devices to be managed.

3. The network management system of claim 2,
   wherein in regions that are stated by the second part of the description file placeholders are entered; and
   wherein for each device to be managed a configuration file is provided in which the significance of the placeholders is defined.

4. The network management system of claim 1, with the description file further comprising:
   information for identification of at least one of the first and the second devices to be managed.

5. The network management system of claim 1,
   wherein the aircraft maintenance computer is configured to cause at least one of the first or second devices to be managed to carry out a test;
   wherein the at least one of the first or second devices to be managed is configured to carry out the caused test and to store results of the test in the description file.

6. The network management system of claim 1,
   with the network management system further comprising:
   a troubleshooting file;
   wherein the aircraft maintenance computer is configured, when there is an exchange of failure information with a device, to perform troubleshooting on the basis of the troubleshooting file.

7. The network management system of claim 1,
   wherein the aircraft maintenance computer is configured to correlate different exchanged failure information.

8. The network management system of claim 1, wherein the description file further comprises:
   a first failure table;
   information relating to the current function state of a device to be managed; and
   a second failure table;
   wherein in the first failure table failures that have occurred before a runtime of the system are stored; and
   wherein in the second failure table failures that have occurred since the beginning of the runtime of the system are stored.

9. A network management system for an aircraft for managing and maintaining a network and a subnetwork, the network management system comprising:
   the network;
   the subnetwork;
   wherein the network comprises:
   an aircraft maintenance computer;
   at least one first device to be managed, which first device to be managed has at least one description file;
   wherein the description file, the first device to be managed and the aircraft maintenance computer are configured to exchange of information between the aircraft maintenance computer and the first device to be managed is possible via SNMP;
   wherein the subnetwork comprises:
   at least one second device to be managed;
   wherein the aircraft maintenance computer is configured for managing and maintaining the first and the second device to be managed;
   wherein the second device to be managed is connected with the first device to be managed to enable the second device to be managed to transmit data that is necessary for management and maintenance to the description file of the first device to be managed;
   whereby the exchange of information between the aircraft maintenance computer and the first device to be managed via SNMP enables the aircraft maintenance computer by only the description file to manage and maintain the first and the second devices to be managed;
   wherein the first device to be managed comprises a Cabin Intercommunication Data System Director (CIDS DIR); and
   wherein the second device to be managed comprises a Cabine Intercommunication Data System (CIDS), that comprises components that are chosen from the group comprising Decoder-Encoder Unit for converting a CIDS protocol into a Controller Area Network (CAN) protocol, Ice Protection Control Unit (IPCU), Potable Water System (PWS), Vacuum Toilet System (VTS), Galley Network Control System (GNCS), subnetwork component of a galley, Cabin Illumination (CIL), Emergency Power Supply System (EPSU), Control Sunlight Blocking System (CSBS), and any combination thereof.

10. The network management system of claim 9, wherein the description file further comprising:
a first part and a second part;
wherein the first part is defined so as to be fixed; and
wherein the second part can be configured to at least the first and second devices to be managed.

11. The network management system of claim 10, wherein in regions that are stated by the second part of the description file placeholders are entered and wherein for each device to be managed a configuration file is provided in which the significance of the placeholders is defined.

12. The network management system of claim 9, wherein the description file further comprises:
a first failure table;
information relating to the current function state of a device to be managed; and
a second failure table;
wherein in the first failure table failures that have occurred before a runtime of the system are stored; and
wherein in the second failure table failures that have occurred since the beginning of the runtime of the system are stored.

13. A network management system for an aircraft for managing and maintaining a network and a subnetwork, the network management system comprising:
the network;
the subnetwork;
wherein the network comprises:
an aircraft maintenance computer;
at least one first device to be managed which first device to be managed has at least one description file;
wherein the description file, the first device to be managed and the aircraft maintenance computer are configured to exchange of information between the aircraft maintenance computer and the first device to be managed is possible via SNMP, the description file further comprising:
a first failure table;
information relating to the current function state of a device to be managed; and
a second failure table;
wherein in the first failure table failures that have occurred before a runtime of the system are stored; and
wherein in the second failure table failures that have occurred since the beginning of the runtime of the system are stored;
wherein the subnetwork comprises:
at least one second device to be managed;
wherein the aircraft maintenance computer is configured for managing and maintaining the first and the second device to be managed;
wherein the second device to be managed is connected with the first device to be managed to enable the second device to be managed to transmit data that is necessary for management and maintenance to the description file of the first device to be managed; and
whereby the exchange of information between the aircraft maintenance computer and the first device to be managed via SNMP enables the aircraft maintenance computer by only the description file to manage and maintain the first and the second devices to be managed.

14. The network management system of claim 13, wherein the description file further comprising:
a first part and a second part;
wherein the first part is defined so as to be fixed; and
wherein the second part can be configured to at least the first and second devices to be managed.

15. The network management system of claim 13, wherein the aircraft maintenance computer is configured to cause at least one of the first or second devices to be managed to carry out a test, and wherein the at least one of the first or second devices to be managed is configured to carry out the caused test and to store results of the test in the description file.

16. The network management system of claim 13, wherein the network management system further comprises a troubleshooting file, and wherein the aircraft maintenance computer is configured, when there is an exchange of failure information with a device, to perform troubleshooting on the basis of the troubleshooting file.

17. The network management system of claim 13, wherein the aircraft maintenance computer is configured to correlate different exchanged failure information.

18. A method for managing and maintaining a network and a subnetwork in an aircraft by means of a network management system, the method comprising:
providing for network within the aircraft;
providing for subnetwork within the aircraft, wherein the network comprises an aircraft maintenance computer and at least one first device to be managed, which comprises a description file, wherein the subnetwork comprises a second device to be managed, and wherein the aircraft maintenance computer is configured for managing and maintaining the first and the second device to be managed;
exchanging information of the description file between the aircraft maintenance computer and the first device to be managed via SNMP, whereby the exchange of information between the aircraft maintenance computer and the first device to be managed via SNMP enables the aircraft maintenance computer by means of only the description file to manage and maintain the first and the second devices to be managed;
transmitting data from the second device to be managed to the description file of the first device to be managed by the second device to be managed, wherein the data is necessary for the management and the maintenance of the second device to be managed;
querying information of the description file for identification of at least one of the first and second devices to be managed by the aircraft maintenance computer;
sending the information of the description file for identification of at least one of the first and second devices to be managed by the aircraft maintenance computer;
querying a first and a second failure table of the description file by the aircraft maintenance computer;
sending the first failure table and the second failure table by the first device to be managed to the aircraft maintenance computer;
wherein in the first failure table failures that have occurred before a runtime of the system are stored;
wherein in the second failure table failures that have occurred since the beginning of the runtime of the system are stored;
querying information of the description file concerning a current function state of a given device by the aircraft maintenance computer; and
sending the information concerning a current function state of the given device by the first device to be managed to the aircraft maintenance computer.

19. The method of claim 18, further comprising:
defining a first part and a second part of the description file;
adapting the first part of the description file to the network management system; and adapting the second part of the description file to a device to be managed.

20. The method of claim 18, further comprising:

initiating a test in a given device to be managed by the aircraft maintenance computer;

carrying out a test by the given device, which test corresponds to initiation; and transmission, by the first device to be managed, of results of the test to the aircraft maintenance computer.

* * * * *

UNITED STATES PATENT AND TRADEMARK OFFICE
CERTIFICATE OF CORRECTION

| | | |
|---|---|---|
| PATENT NO. | : 8,190,727 B2 | Page 1 of 1 |
| APPLICATION NO. | : 12/503310 | |
| DATED | : May 29, 2012 | |
| INVENTOR(S) | : Wolfram Henkel | |

It is certified that error appears in the above-identified patent and that said Letters Patent is hereby corrected as shown below:

In the Specification
Column 1, line 51, "provided" should read -- provide --.
Column 2, line 45, "facilitates" should read -- facilitate --.
Column 2, line 47, "makes" should read -- make --.
Column 3, line 27, between "so" and "called" insert -- - --.
Column 5, line 5, after "transmission" insert -- is --.
Column 6, line 51, "safe" should read -- save --.
Column 6, line 57, "device" should read -- devices --.
Column 8, line 37, between "so" and "called" insert -- - --.
Column 9, line 18, between "so" and "called" insert -- - --.
Column 9, line 57, after "optionally" insert -- in --.
Column 11, line 65, delete "Although the invention herein".
Column 12, line 46, after "defines" delete ",".
Column 12, line 50, "fur" should read -- for --.
Column 12, line 67, "a" should read -- an --.
Column 14, line 47, "a well" should read -- as well --.
Column 14, line 53, after "conclude" delete ",".
Column 15, line 8, "a" should read -- an --.
Column 16, line 7, after "avoid" delete ",".

In the Claims
Column 17, line 30, "device" should read -- devices --.
Column 18, line 43, "device" should read -- devices --.
Column 19, line 2, "comprising" should read -- comprises --.
Column 19, line 51, "device" should read -- devices --.
Column 19, line 63, "comprising" should read -- comprises --.
Column 20, line 20, insert -- a -- between "for" and "network".
Column 20, line 21, insert -- a -- between "for" and "subnetwork".
Column 20, line 27, "device" should read -- devices --.

Signed and Sealed this
Eighth Day of September, 2015

Michelle K. Lee
*Director of the United States Patent and Trademark Office*